(12) United States Patent
Ando et al.

(10) Patent No.: US 7,108,179 B2
(45) Date of Patent: Sep. 19, 2006

(54) OBJECT DETECTING APPARATUS AND IRREGULARITY DETECTING DEVICE FOR THE SAME

(75) Inventors: Takamasa Ando, Gifu (JP); Yoshiaki Hoashi, Kariya (JP); Takekazu Terui, Kariya (JP)

(73) Assignee: DENSO Corporation, Kariya (JP)

( * ) Notice: Subject to any disclaimer, the term of this patent is extended or adjusted under 35 U.S.C. 154(b) by 22 days.

(21) Appl. No.: 11/081,025

(22) Filed: Mar. 15, 2005

(65) Prior Publication Data

US 2005/0205672 A1 Sep. 22, 2005

(30) Foreign Application Priority Data

Mar. 16, 2004 (JP) ............................. 2004-074382

(51) Int. Cl.
*G07B 15/02* (2006.01)
(52) U.S. Cl. ..................................................... 235/384
(58) Field of Classification Search ................ 235/384, 235/454, 462.25; 180/169; 702/159; 340/436; 342/70
See application file for complete search history.

(56) References Cited

U.S. PATENT DOCUMENTS

| 5,515,156 | A | | 5/1996 | Yoshida et al. |
| 5,689,328 | A | | 11/1997 | Katayama |
| 5,970,433 | A | * | 10/1999 | Oka et al. ..................... 702/159 |
| 6,265,968 | B1 | * | 7/2001 | Betzitza et al. .............. 340/436 |
| 6,580,385 | B1 | * | 6/2003 | Winner et al. ................. 342/70 |
| 2002/0157887 | A1 | * | 10/2002 | Sugawara et al. ........... 180/169 |

FOREIGN PATENT DOCUMENTS

| JP | 7-280925 | 10/1995 |
| JP | 2002-031685 | 1/2002 |

* cited by examiner

*Primary Examiner*—Thien M. Le
*Assistant Examiner*—April A. Taylor
(74) *Attorney, Agent, or Firm*—Harness, Dickey & Pierce, PLC

(57) ABSTRACT

An object detecting apparatus for detecting an object or a distance with the object includes at least one light receiving element for detecting a light quantity entering from a sensor window portion for example, a projection window portion and an entrance window portion through which an electromagnetic wave from an electromagnetic wave generation portion toward an object and a reflected electromagnetic wave from the object pass. Furthermore, an irregularity determining portion determines a state of at least one of the projection window portion and the entrance window portion using at least the detected light quantity of the light receiving element. For example, the light receiving element includes a first light receiving portion and a second light receiving portion which receive the light quantities of direct current part of light entering from the first and second light receiving portions.

17 Claims, 4 Drawing Sheets

OBJECT DETECTING APPARATUS AND IRREGULARITY DETECTING DEVICE FOR THE SAME

PRIORITY STATEMENT

This application claims priority under 35 U.S.C. § 119 of Japanese Patent Application No. 2004-74382 filed on Mar. 16, 2004, the contents of which are incorporated herein by reference in their entirety.

FIELD OF THE INVENTION

Example embodiments of the present invention relate to an object detecting apparatus for detecting an object using an electromagnetic wave, for example, a light wave, and an irregularity detecting device of an object detecting apparatus. The object detecting apparatus may be disposed in or on a first vehicle to detect an object near the first vehicle or to detect a distance between the first vehicle and an object, for example, a second vehicle.

BACKGROUND OF THE INVENTION

In a conventional distance detecting apparatus mounted on a vehicle, a distance between the vehicle and an object, such another vehicle (for example, forward of the vehicle including the conventional distance detecting apparatus), may be detected using a laser beam. The distance detecting apparatus intermittently radiates the laser beam from a laser diode to irradiate the forward vehicle and detect reflected light from the forward vehicle. The distance detecting apparatus detects the distance from the vehicle to the forward vehicle based on a difference between a light radiating time and a light receiving time.

For example, a conventional distance detecting apparatus includes an irradiation portion for irradiating the laser beam, a polygon mirror, for example, a rotatable scan mirror having a truncated hexagon pyramid shape, and a laser light receiving portion for receiving the reflected light from the forward vehicle. In such a conventional distance detecting apparatus, the laser light irradiated from the irradiation portion may be reflected by the polygon mirror and introduced into a vehicle including conventional distance detecting apparatus from a front side. However, in such an arrangement, if dirt or another irregularity is present on a sensor surface, for example, a transparent surface for passing the laser beam therethrough, the distance cannot be accurately detected.

SUMMARY OF THE INVENTION

The present invention provides an irregularity detecting device for an object detecting apparatus, which can detect an irregularity on a sensor window portion of the object detecting apparatus.

The present invention provides an irregularity detecting device which can detect an irregularity using one ore more directly received light streams, one or more reflected light streams, or a combination thereof.

The present invention provides an irregularity detecting device which can detect an irregularity on a sensor window portion using two or more measured light amount.

The present invention provides an irregularity detecting device which can detect an irregularity using a ratio of the at least two measured light quantity.

The present invention provides an irregularity detecting device which can detect an irregularity using two or more measured light quantities, where at least one of the light quantities is a reference value.

The present invention provides an object detecting apparatus, which can accurately detect an object by detecting an irregularity on a sensor window portion.

The present invention provides an object detecting apparatus mounted to a vehicle, which can accurately detect an object near the vehicle and/or a distance between the vehicle and the object.

The present invention provides an object detecting apparatus, which can accurately detect an object by detecting an irregularity on a sensor window portion and either compensating for or removing the irregularity from the sensor window portion.

In an example embodiment of the present invention, the irregularity may be anything that alters the path of waves, for example, electromagnetic waves, incident thereon. An irregularity may include any type of earth, for example, dirt, mud, stone, etc., any type of precipitation, for example, water, rain, sleet, snow, ice, hail, etc., any type of automotive byproduct, for example, soot, brake dust, exhaust, paint, etc., any type of insect, plant, grass, weed, etc., any type of crack, scratch, nick, chip, etc., or any other type of wave obstruction.

In an example embodiment of the present invention, the object may be another vehicle, for example, an automobile, truck, bus, or motorcycle or anything other than vehicle, for example, buildings, light poles, traffic light poles, any type of roadside or parking signage, trees, bicyclists, pedestrians, etc.

In an example embodiment, the present invention is directed to an object detecting apparatus for detecting an object or a distance from the object. The object detecting apparatus includes an electromagnetic wave generation portion disposed in a case to generate and radiate a searching electromagnetic wave, a projection window portion disposed in the case and having a wave passing surface made of a wave permeating material for passing through the searching electromagnetic wave generated from the electromagnetic wave generation portion, an electromagnetic wave receiving portion disposed in the case for receiving a reflected wave of the searching electromagnetic wave, reflected from the object, and an entrance window portion disposed in the case. The entrance window portion has a wave passing surface made of a wave permeating material for passing through the reflected wave before being received to the electromagnetic wave receiving portion.

In the object detecting apparatus, a first light receiving element is disposed in the case to detect a light quantity of a direct current part of light entering from at least one sensor window portion, for example, the projection window portion and/or the entrance window portion, and an irregularity determining portion determines a state of the sensor window portion using at least the detected light quantity of the first light receiving element. Accordingly, an irregularity on the sensor window portion, for example, the projection window portion and the entrance window portion can be detected. As a result, the object detecting device can accurately detect an object or a distance from the object by detecting and either compensating for or removing the irregularity from the projection window portion or the entrance window portion.

In an example embodiment, the first light receiving element can be disposed in the case to detect the light quantity of the direct current part of light entering from the projection window portion, and the object detecting apparatus can further include a second light receiving element disposed in the case to detect a light quantity of the direct current part of light entering from the entrance window portion. In an example embodiment, the irregularity determining portion determines the state of at least one of the projection window portion and the entrance window portion based on the detected light quantity of the first light receiving element and the detected light quantity of the second light receiving element.

Alternatively, the object detecting apparatus may include a light receiving window portion provided in the case at a position different from the projection window portion and the entrance window portion to pass through the direct current part of light from an exterior of the case, and a second light receiving element disposed in the case to detect a light quantity of the direct current part of light entering from the light receiving window portion. In this case, the irregularity determining portion determines the state of the projection window portion or the entrance window portion based on the detected light quantity of the first light receiving element and the detected light quantity of the second light receiving element.

Alternatively, the object detecting apparatus may include a light quantity detecting unit disposed outside the case to detect a light quantity. In an example embodiment, the irregularity determining portion determines the state of at least one of the projection window portion and the entrance window portion based on the detected light quantity of the first light receiving element and the detected light quantity of the light quantity detecting unit.

In an example embodiment, each of the first and second light receiving elements generates an output voltage in accordance with the light quantity of the received direct current part, and the irregularity determining portion determines the state of at least one of the projection window portion and the entrance window portion based on a ratio of the output voltages generated from the first and second light receiving elements.

In the object detecting apparatus, the irregularity determining portion can be provided in a control portion inside the case. Furthermore, the case may be disposed in a vehicle so that the object detecting apparatus detects an object near the vehicle or a distance between the vehicle and the object.

According to another example embodiment of the present invention, an object detecting apparatus is provided with a light receiving element disposed in the case at a position where a direct current part of light entering from at least one of the projection window portion and the entrance window portion is restricted to be received, so as to detect a scattering light part of the direct current part, which generates when an irregularity is present on at least one of the projection window portion and the entrance window portion. In this case, an irregularity determining portion determines a state of at least one of the projection window portion and the entrance window portion using the detected light quantity of the light receiving element.

According to another example embodiment of the present invention, an irregularity detecting device for an object detecting apparatus having a sensor window portion includes a light receiving element that is disposed to detect a light quantity entering from the sensor window portion, and an irregularity determining portion which determines a state of the sensor window portion using the detected light quantity of the light receiving element.

For example, the light receiving element can include a first light receiving portion and a second light receiving portion which receive the light quantities of direct current part of light entering from different positions of the sensor window portion. In an example embodiment, the irregularity determining portion determines the state of the sensor window portion based on the detected light quantities of the first and second light receiving portions.

BRIEF DESCRIPTION OF THE DRAWINGS

The present invention will become more apparent from the following detailed description of example embodiments made with reference to the accompanying drawings, in which.

DETAILED DESCRIPTION OF EXAMPLE EMBODIMENTS

Example embodiments will be described with reference to FIGS. 1–3. An object detecting device shown in FIGS. 1–3 can be disposed in or on a vehicle (for example, an automobile, truck, bus, or motorcycle) to detect an object (for example, another vehicle) near the vehicle or to detect a distance between the vehicle and the object. The object may be another vehicle ahead of, behind, or to the side (either left or right) of the vehicle. Alternatively, the object may be other than a vehicle (for example, buildings, light poles, traffic light poles, any type of roadside or parking signage, trees, pedestrian, etc.).

In an example embodiment, the object detecting apparatus can use a laser radar disposed in the vehicle to detect an object in front of the vehicle or to detect a distance between the vehicle and object in an automatic (or adaptive) cruise control (ACC) mode. In an example embodiment, the object detecting apparatus can be arranged in the vehicle such that a side (in the example of FIG. 1, the right side) of the object detecting apparatus faces forward (in the direction in which the vehicle is proceeding).

Figure 1:
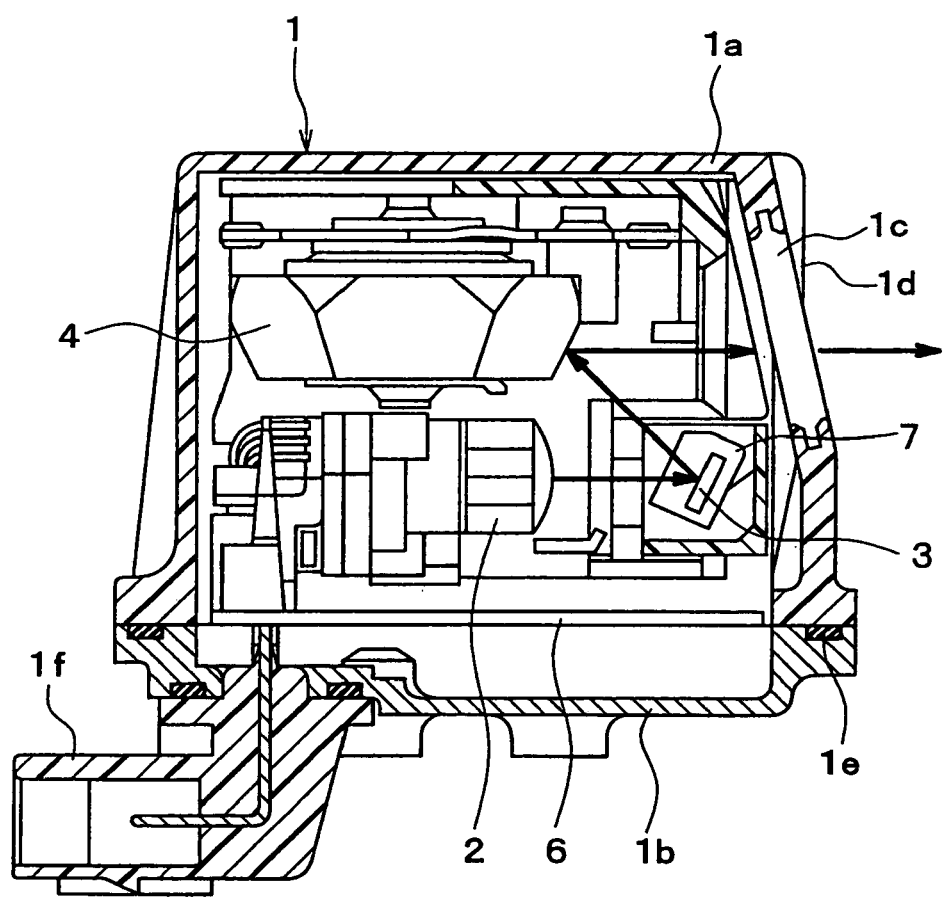
FIG. 1 is a cross-sectional view of an object detecting apparatus according to an example embodiment of the present invention.

As shown in FIG. 1, the object detecting apparatus includes a case 1 having an approximately cubic shape. The case 1 includes a first case part 1a and a second case part 1b. The first case part 1a has at least one open side and forms a receiving space in which various components may be arranged. The first case part 1a can be made of a resin material.

The first case part 1a includes one or more sensor window portions, for example, a projection window portion 1c and an entrance window portion 1d. The projection window portion 1c and the entrance window portion 1d can be provided in a surface of the first case part 1a, facing the vehicle forward side and can be arranged in a horizontal direction as shown in FIG. 2. In an example embodiment, the projection window portion 1c and/or the entrance window portion 1d can be made of a translucent material, for example, a glass or an acrylic resin.

In an example embodiment, the second case part 1b may be made of a resin material. The second case part 1b is attached at a periphery of the opening in the first case part 1a using a seal member 1e.

As shown in FIG. 1, in an example embodiment, a connector if is disposed with the second case part 1b to protrude from the case 1. An interior of the case 1 may be electrically connected to an exterior of the case 1 through the connector 1f.

In an example embodiment, components within the case 1 include an irradiation portion 2, a reflection mirror 3, a polygon mirror 4, a light receiving portion 5 and a circuit board 6. The circuit board 6 may include a control portion 6a for controlling sensor operation of the object detecting apparatus.

The irradiation portion 2 may be driven based on an electrical current supplied from the control portion 6a to irradiate laser light toward the reflection mirror 3. For example, the irradiation portion 2 is constructed with a laser diode to generate a pulse laser light (for example, a laser beam or a search beam).

The reflection mirror 3 reflects the laser light irradiated from the irradiation portion 2 toward the polygon mirror 4. The reflection mirror 3 is supported by a support member 7 to be movable (for example, tiltable or rockable) with respect to the case 1. The support member 7 can be fixed to an inner wall of the case 1.

The reflection mirror 3 is tilted or rocked by a motor (not shown) driven by the control portion 6a, so that a reflection angle of the reflection mirror 3 can be adjusted relative to an axial line (for example, an axial line that is perpendicular to the paper of FIG. 1). For example, the reflection angle of the reflection mirror 3 is adjusted relative to the axial line by less than one degree or by one degree or more.

In an example embodiment, the polygon mirror 4 is formed as a truncated hexagon pyramid. The polygon mirror 4 can be rotatably supported by the case 1 at a top surface of the case 1 to be rotatable around an axial line of the hexagon pyramid. The polygon mirror 4 can be driven and rotated by a motor (not shown) operated by the control portion 6a. Because all side surfaces of the polygon mirror 4 are used as reflection mirrors, the polygon mirror 4 operates as scan mirrors.

When the laser light irradiated from the irradiation portion 2 is reflected by the reflection mirror 3, the reflected light from the reflection mirror 3 is further reflected by the polygon mirror 4. The reflected light from the polygon mirror 4 may be guided to the vehicle front side through the projection window portion 1c of the first case part 1a. Furthermore, when the polygon mirror 4 is driven by the motor, the angle of each side surface of the polygon mirror 4 may change in accordance with the rotation of the polygon mirror 4, and a projection angle of the reflected light from the polygon mirror 4 may change so as to scan a desired range at the vehicle front side.

Figure 2:
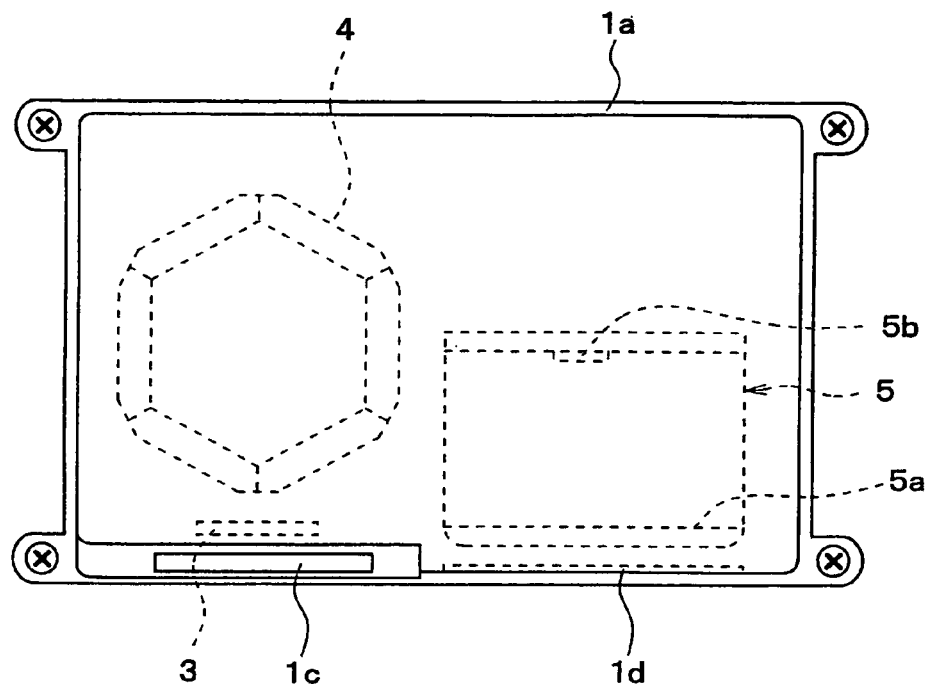
FIG. 2 is a schematic view of an object detecting apparatus according to an example embodiment of the present invention.

In an example embodiment, the light receiving portion 5 may include a Fresnel lens 5a and/or a light receiving element 5b, as shown in FIG. 2. The light receiving element 5b includes a photodiode, for example. In the light receiving portion 5, the laser light is collected by the Fresnel lens 5a. When the collected laser light is irradiated from the Frensel lens 5a to the light receiving element 5b, an output current or an output voltage corresponding to the received light intensity is generated. Accordingly, the light receiving portion 5 can detect the laser light irradiated on the case 1 (e.g., the upper side in FIG. 2).

In an example embodiment, the light receiving portion 5 is arranged at a side of the polygon mirror 4 to be offset from the polygon mirror 4 in a direction perpendicular to the rotation axis of the polygon mirror 4, as shown in FIG. 2.

In an example embodiment, various parts constituting the control portion 6a is mounted on the circuit board 6. The control portion 6a includes an object determining portion including a distance determining portion and/or an irregularity determining portion. The control portion 6a provided on the circuit board 6 outputs various signals for detecting an object or the distance from the object to the vehicle, and determines an object or the distance from the object to the vehicle by receiving output signals from the light receiving portion 5. Furthermore, the irregularity determining portion of the control portion 6a performs an irregularity determination by receiving output signals (output values) from one or more light receiving elements, such as first and second light receiving elements 10, 11. As shown in FIG. 3, the first and second light receiving elements 10, 11 can be provided inside the case 1.

In an example embodiment, the first light receiving element 10 is arranged opposite to the projection window portion 1c. The first light receiving element 10 can receive ambient light, including sunlight and light surrounding the exterior of the case 1, and direct current light (hereinafter, referring to as "DC light") from lamps of the vehicle and other vehicles (for example, headlights of an oncoming vehicle), for example, which enter through the projection window portion 1c. The first light receiving element 10 can generate an output voltage or an output current based on a received light quantity. In an example embodiment, the first light receiving element 10 is mounted on the circuit board 6 to be electrically connected to the control portion 6a.

In an example embodiment, the second light receiving element 11 is arranged opposite to the entrance window portion 1d. The second light receiving element 11 can receive DC light entering through the entrance window portion 1d and generate an output current or an output voltage based on a received light quantity. In an example embodiment, the second light receiving element 11 is mounted on the circuit board 6 to be electrically connected to the control portion 6a.

Operation of the object detecting apparatus mounted on a vehicle for detecting an object, for example, an object near the vehicle and/or a distance between the object and the vehicle in accordance with an example embodiment of the present invention, will be now described.

In an example embodiment, an object detecting apparatus can detect an object, for example, a vehicle ahead of a vehicle having the object detecting apparatus and can detect a distance between the object and the vehicle in an automatic (or adaptive) cruise control (ACC) mode.

In an example embodiment, when an irradiation output of the laser light is a value in a range consistent with a running vehicle, the mirror motor may be driven based on a driving signal from a driving circuit, and the reflection mirror 3 may be adjusted to a desired angle.

Laser light is irradiated from the irradiation portion 2 at desired timing, reflected by the reflection mirror 3 and the polygon mirror 4, and irradiated forward of the vehicle from the projection window portion 1c. When an object is present, for example, a forward vehicle, the irradiated laser light from the projection window portion 1c is reflected by the object, collected at the Fresnel lens 5a through the entrance window portion 1d, and irradiated on the light receiving element 5b of the light receiving portion 5.

In an example embodiment, the light receiving element 5b generates an output current or an output voltage in accordance with an intensity of the laser light received by the light receiving element 5b. The output current or the output voltage generated from the light receiving element 5b is amplified by an amplification circuit (not shown), and is input to a calculation portion in the control portion 6a provided in the circuit board 6. The calculation portion calculates the distance between the vehicle and the object using a time difference Δt between a time at which the laser light was irradiated and a time at which the laser light was detected. In an example embodiment, the calculation portion of the control portion 6a calculates a distance L between the vehicle and the object based on example formula (1) by using the speed S of the laser light and the time difference Δt.

$$L = S \times \Delta t / 2 \quad (1)$$

When the distance between the vehicle and the object, for example, the forward vehicle, is determined, an output corresponding to the determined distance is output from the control portion 6a through the connector if external to the case 1, for example, to an engine electronic control unit (ECU) and/or a brake ECU. An engine output and/or a braking force can be controlled by the engine ECU and/or the brake ECU, so that the distance between the vehicle and the object, for example, a forward vehicle, can be maintained in a desired range (e.g., a desired distance).

In an example embodiment, when the vehicle is in an automatic (or adaptive) cruise control (ACC) mode, an irregularity determination portion of the control portion 6a performs an irregularity determination on the sensor window portion. When output values from one or more of the light receiving elements 10, 11, etc., are input to the control potion 6a, the output values are converted to digital output values by an A/D converter provided in the control portion 6a. The irregularity determination portion determines an irregular state of the sensor window portion, for example, the projection window portion 1c and/or the entrance window portion 1d, based on the output values of one or more of the light receiving elements 10, 11, etc.

For example, when the first and second light receiving elements 10, 11 generate output voltages in accordance with the light quantity of the DC light, a ratio between digital-converted output voltages of the light receiving elements 10, 11 can be calculated, and an irregular or regular state of the sensor window portion can be determined based on the ratio.

If an irregularity is present on the projection window portion 1c or the entrance window portion 1d, the entering DC light may be irregularly reflected by the irregularity. For example, if the projection window portion 1c or the entrance window portion 1d has dirt thereon, the entering DC light may be irregularly reflected by the dirt. Further, the ratio between the output values of the light receiving elements 10, 11, etc., is changed based on the irregular state of the projection window portion 1c or the entrance window portion 1d. In an example embodiment, the irregularity determining portion determines the state of at least one of the projection window portion 1c and the entrance window portion 1d so that the object detecting apparatus can accurately detect an object or a distance from the object.

In an example embodiment, the irregularity can be anything that alters the path of waves, for example, electromagnetic waves, incident thereon. An irregularity may include any type of earth, for example, dirt, mud, stone, etc., any type of precipitation, for example, water, rain, sleet, snow, ice, hail, etc., any type of automotive byproduct, for example, soot, brake dust, exhaust, paint, etc., any type of insect, plant, grass, weed, etc., any type of crack, scratch, nick, chip, etc., or any other type of wave obstruction.

For example, when the ratio between the output values of the light receiving elements 10, 11 is larger than a first value or is lower than a second value that is lower than the first value, the irregularity determination portion of the control portion 6a determines that there is an irregularity on the projection window portion 1c or the entrance window portion 1d. In this example, the object or the distance between the vehicle and the object may be not accurately determined.

When the irregularity determining portion of the control portion 6a determines that the projection window portion 1c or the entrance window portion 1d has an irregularity, an irregularity generation signal is output to the exterior of the case 1 through the connector 1f. In this example, a warning may be generated in the passenger compartment of the vehicle, for example, a warning lamp provided on an instrument panel of the passenger compartment of the vehicle may be illuminated to indicate an unusual state of the automatic detection of the object or the distance between the vehicle and the object, for example.

Alternatively, in another example, an indicator inquiring whether the driver of the vehicle would like to continue automatic (or adaptive) cruise control (ACC) mode may be provided on the instrument panel.

In the object detecting apparatus of an example embodiments of the present invention, the irregularity on the projection window portion 1c or the entrance window portion 1d can be detected based on the DC light entering from the projection window portion 1c and DC light entering the entrance window portion id. Thus, even when a light source for detecting the irregularity is not provided, the irregularity detection can be performed using the entering DC light. Furthermore, when the irregularity is detected, irregularity detection information is provided to the driver of the vehicle. Therefore, it is possible to more accurately detect an object or the distance between the object and the vehicle by removing the irregularity.

According to the above-described example embodiments, the object detecting apparatus can include an irregularity detecting device for detecting an irregularity on at least one of the projection window portion 1c and the entrance window portion 1d. The irregularity detecting device can be provided with the first light receiving element 10 for detecting the light quantity of a direct current part entering the projection window portion 1c, and the second light receiving element 11 for detecting the light quantity of a direct current part entering from the entrance window portion 1d.

In example embodiments, an irregularity detecting portion of an irregularity detecting device may determine a state of the projection window portion 1c or the entrance window portion 1d using the detected light quantities of the first and second light receiving elements 10, 11. That is, by comparing the ratio of the detected light quantities (e.g., output voltages) of the first and second light receiving elements 10, 11, a state of the projection window portion 1c or the entrance window portion 1d can be determined.

In example embodiments, one or more first light receiving elements 10 may be positioned before the projection window 1c. In example embodiments, one or more second light receiving elements 11 may be positioned before the entrance portion window 1d. In example embodiments, one or more first light receiving elements 10 may be positioned before the projection window 1c and one or more second light receiving elements 11 may be positioned before the entrance portion window 1d.

In example embodiments, the laser light may be any type of wave, for example, radar, ultrasonic, sonar, microwave, infrared, may be active or passive, and/or may be of any wavelength, for example, radio, microwave, infrared, visible, ultraviolet, x-ray, gamma ray.

In example embodiments, the laser light may be generated by any type of laser.

Additional example embodiments of the present invention will be now described with reference to FIG. 4.

In other example embodiments, a light quantity sensor 20 (light quantity detecting unit) provided with the vehicle outside the case 1 may be used in addition to or instead of a second (or additional) light receiving element 11. For example, the light quantity sensor 20 is a light sensor generally used for determining a light quantity around the vehicle in a case where head lights of the vehicle are automatically turned on or off.

In other example embodiments, the irregularity determination portion of the control portion 6a determines a state of the projection window portion 1c or the entrance window portion 1d by using an output value of the light quantity sensor 20 and an output value of one of the light receiving elements, for example, the first light receiving element 10. Because a light quantity of the DC light entering the projection window portion 1c or the entrance window portion 1d can be detected by an output value of the light quantity sensor 20, the irregularity can be detected based on a relationship between the output value of the light receiving element, for example, the first light receiving element 10 and the output value of the light quantity sensor 20. For example, when the output value of the first light receiving element 10 decreases while the light quantity detected by the light quantity sensor 20 does not change, it can be determined that there is an irregularity associated with the projection window portion 1c.

Similarly to the example embodiments described above, output values of the first light receiving element 10 and the light quantity sensor 20 can be digitally converted, and the state of the projection window portion 1c can be detected by an irregularity determination portion of the control portion 6a based on the ratio between the digitally converted output values of the first light receiving element 10 and the light quantity sensor 20.

Figure 3:
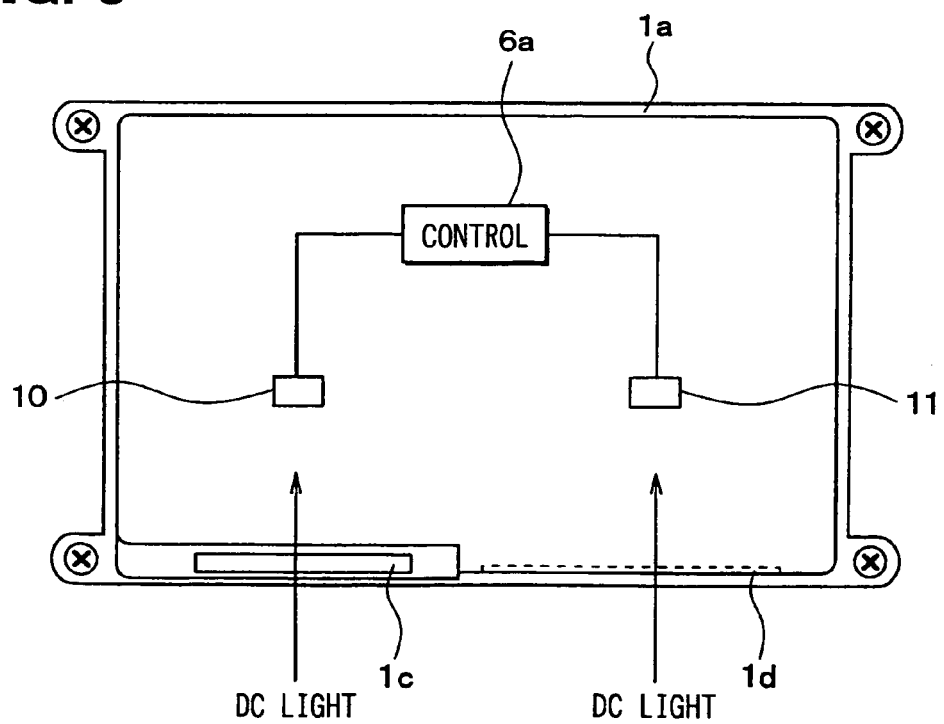
FIG. 3 is a schematic view of an irregularity detecting device according to an example embodiment of the present invention.
Figure 4:
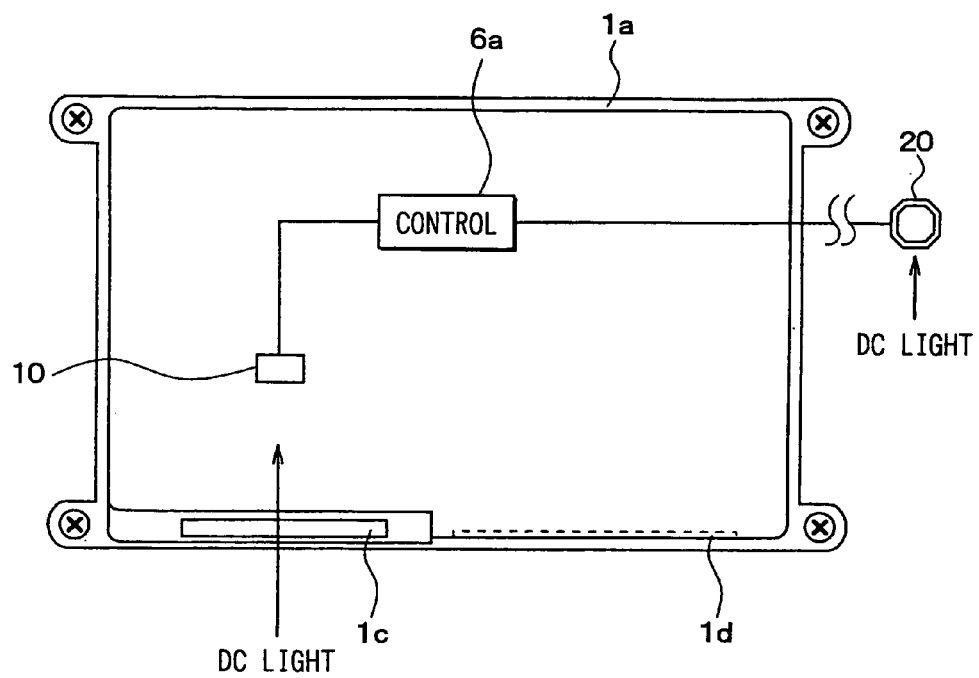
FIG. 4 is a schematic view of an irregularity detecting device according to another example embodiment of the present invention.

In the example embodiments using FIG. 4, the other parts of FIG. 4 may be similar to those of FIG. 3.

In the above-described example embodiments, one or more first light receiving elements 10 may be positioned before the projection window 1c. In the above-described example embodiments, one or more second light receiving elements 11 may be positioned before the entrance portion window 1d. In the above-described example embodiments, one or more first light receiving elements 10 may be positioned before the projection window 1c and one or more second light receiving elements 11 may be positioned before the entrance portion window 1d.

Additional example embodiments of the present invention will be now described with reference to FIG. 5. In example embodiments, the second (or subsequent) light receiving elements 11 need not be provided, and a first light receiving element 10' is arranged at a position that does not directly face a sensor surface of the projection window portion 1c. In an example embodiment, the first light receiving element 10' is arranged at a position where the DC light does not directly enter from the projection window portion 1c. Further, an object or a distance between the object and the vehicle can be determined using only an output value of the first light receiving element 10'.

In an example embodiment, when an irregularity is not present on the projection window portion 1c, a substantial portion of the DC light is not irregularly reflected, and a substantial portion of the DC light does not directly enter the first light receiving element 10'. When an irregularity is present on the projection window portion 1c, for example, when dirt adheres on the projection window portion 1c, the DC light is irregularly reflected by the irregularity on the projection window portion 1c, and a scattering light part of the DC light, scattered by the irregularity may enter the first light receiving element 10'. Accordingly, the output value of the first light receiving element 10' changes depending on whether an irregularity is present on the projection window portion 1c or not. Thus, the irregularity determining portion of the control portion 6a can determine the state of the projection window portion 1c based on the variation in the output value of the first light receiving element 10'.

Figure 5:
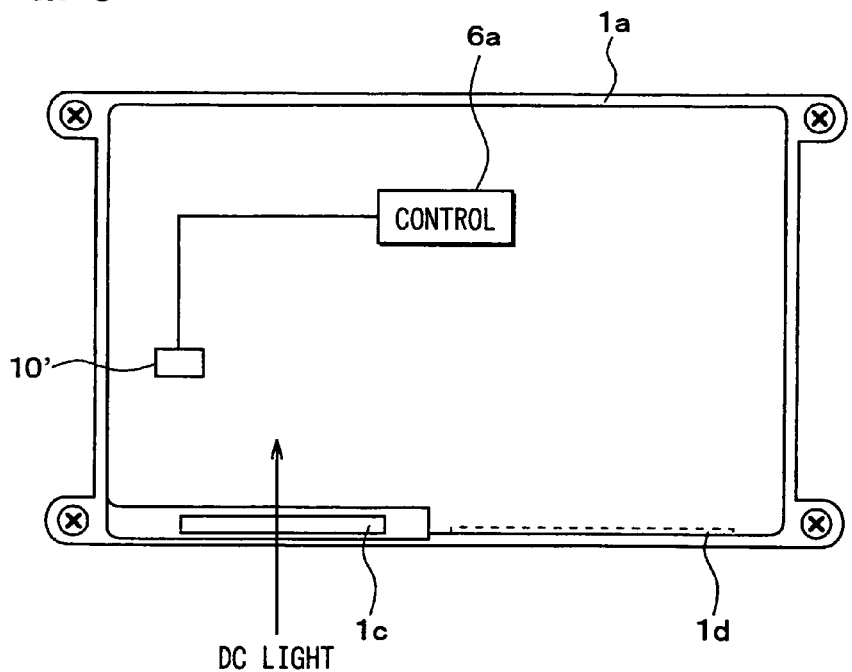
FIG. 5 is a schematic view of an irregularity detecting device according to another example embodiment of the present invention.

In the example embodiments with FIG. 5, one or more first light receiving elements 10' may be positioned before the projection window 1c. In the example embodiments with FIG. 5, one or more second light receiving elements 11' may be positioned before the entrance portion window 1d. In example embodiments, one or more first light receiving elements 10' may be positioned before the projection window 1c and one or more second light receiving elements 11' may be positioned before the entrance portion window 1d. Hear, the second light receiving element 11' is disposed to detecting a scattering light part of the DC light, scattered by the irregularity, similarly to the first light receiving element 10'.

Although example embodiments of the present invention have been described above with reference to the accompanying drawings, it is to be noted that various changes and modifications will become apparent to those skilled in the art.

In some of the example embodiments described above, the first light receiving element 10 may be arranged at a side of the projection window portion 1c, and the second light receiving element 11 may be arranged at a side of the entrance window portion 1d. However, this is an example, and the arrangement positions of the first light receiving element 10 and the second light receiving element 11 may be suitably changed. As an example, when the projection window portion 1c and the entrance window portion 1d are integrally formed to form a light receiving and irradiating window, the first and second light receiving elements 10, 11 may be arranged at different positions of the light receiving and irradiating window, and the irregularity may be detected based on the output values of the first and second light receiving elements 10, 11.

Furthermore, one of the first and second light receiving elements 10, 11 may be arranged to face one position of the projection window portion 1c and the entrance window portion 1d, and the other one of the first and second light receiving elements 10, 11 may be arranged at a position different from the window portions 1c, 1d, where the DC light can be received.

Figure 6:
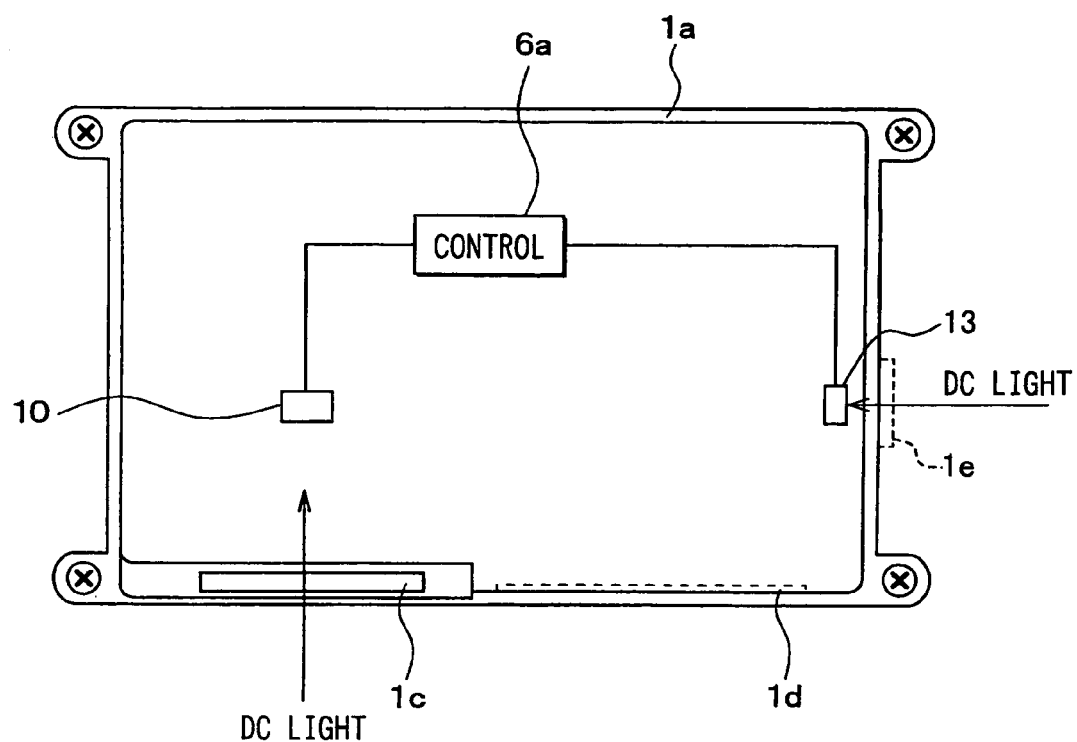
FIG. 6 is a schematic view of an irregularity detecting device according to another example embodiment of the present invention.

For example, when the first light receiving element 10 is arranged to face one of the projection window portion 1c and the entrance window portion 1d, a light entering window 1e for introducing the DC light to be detected can be provided on another surface of the case 1, for example, a side surface, and a light receiving element 13 can be provided to receive light entering from the light entering window 1e, as shown in FIG. 6.

Generally, an irregularity may be less likely to occur on a side surface of the case 1. Accordingly, the state of the projection window portion 1c or the entrance window portion 1d can be detected using the output value of the light receiving element 13 as a reference output value. Therefore, by using the output value of the first light receiving element 10 and the output value of the light receiving element 13, the state of the projection window portion 1c or the entrance window portion 1d, at which the first light receiving element 10 is arranged, can be detected.

In example embodiments with FIG. 6, one or more first light receiving elements 10 may be positioned before the projection window 1c. In example embodiments with FIG. 6, one or more second light receiving elements 11 may be positioned before the entrance portion window 1d. In example embodiments with FIG. 6, one or more first light receiving elements 10 may be positioned before the projection window 1c and one or more second light receiving elements 11 may be positioned before the entrance portion window 1d.

Still further, in other example embodiments, both the first and second light receiving elements 10, 11 may be arranged at different positions in one of the projection window portion 1c and the entrance window portion 1c. In such example embodiments, one of the output values of the first and second light receiving elements 10, 11 may be used as a reference output value, and the state of the one of the projection window portion 1c and the entrance window portion 1d can be detected.

In some of the example embodiment described above, the state of the projection window portion 1c or the entrance window portion 1d can be detected using one of the first and second light receiving elements 10, 11. That is, when a reference value without the irregularity is stored in the irregularity determining portion of the control portion 6a, the state of the projection window portion 1c or the entrance window portion 1d can be determined only using one of the first and second light receiving elements 10, 11.

In some of the example embodiment described above, the first light receiving element 10 (10') may be arranged at the side of the light projection window portion 1c; however, the first light receiving element 10 (10') may be arranged at the side of the entrance window portion 1d.

Furthermore, the arrangements of the projection window portion 1d and the entrance window portion 1e in the object detecting apparatus can be suitable changed. For example, the projection window portion id and the entrance window portion 1e may be arranged in a vertical direction in FIG. 1.

In the above-described example embodiments, an object or a distance between the object and a vehicle may be detected using the laser light wave from the irradiation portion 2. However, other waves, including electromagnetic waves, for example, a millimeter wave may also be used. In such example embodiments, the projection window portion 1c and the entrance window portion 1d may include wave passing surfaces made of a wave permeating material for passing through the reflected waves.

In the above-described example embodiments, an outgoing electromagnetic wave from an electromagnetic wave generation portion may be reflected by, for example, the reflection mirror 3 and the polygon mirror 4, and the reflected electromagnetic wave may be received by an electromagnetic receiving portion. However, in other example embodiments, another structure, including mirror(s) in other arrangements or not including mirrors at all, may also be used.

While the invention has been described with reference to example embodiments thereof, it is to be understood that the invention is not limited to the example embodiments. The invention is intended to cover various modifications, variations, and equivalent arrangements. In addition, while the various elements of the example embodiments are shown in various combinations and configurations, these various combinations and configurations are examples, and other combinations and configuration, including more, less or only a single element, are also within the spirit and scope of the invention.

What is claimed is:

1. An object detecting apparatus for detecting an object or a distance from the object, the object detecting apparatus comprising:
   a case;
   an electromagnetic wave generation portion disposed in the case to generate and radiate a searching electromagnetic wave;
   a projection window portion disposed in the case, the projection window portion having a wave passing surface made of a wave permeating material for passing through the searching electromagnetic wave generated from the electromagnetic wave generation portion;
   an electromagnetic wave receiving portion disposed in the case for receiving a reflected wave of the searching electromagnetic wave, reflected from the object;
   an entrance window portion disposed in the case, the entrance window portion having a wave passing surface made of a wave permeating material for passing through the reflected wave before being received to the electromagnetic wave receiving portion;
   a first light receiving element disposed in the case to detect a light quantity of a direct current part of light entering from at least one of the projection window portion and the entrance window portion; and
   an irregularity determining portion which determines a state of at least one of the projection window portion and the entrance window portion using at least the detected light quantity of the first light receiving element.

2. The object detecting apparatus according to claim 1, wherein the first light receiving element is disposed in the case to detect the light quantity of the direct current part of light entering from the projection window portion, the apparatus further comprising
   a second light receiving element disposed in the case to detect the light quantity of the direct current part of light entering from the entrance window portion,
   wherein the irregularity determining portion determines the state of at least one of the projection window portion and the entrance window portion based on the detected light quantity of the first light receiving element and the detected light quantity of the second light receiving element.

3. The object detecting apparatus according to claim 2, wherein:
   each of the first and second light receiving elements generates an output voltage in accordance with the light quantity of the received direct current part; and
   the irregularity determining portion determines the state of at least one of the projection window portion and the entrance window portion based on a ratio of the output voltages generated from the first and second light receiving elements.

4. The object detecting apparatus according to claim 1, further comprising:
a light receiving window portion provided in the case at a position different from the projection window portion and the entrance window portion to pass through the direct current part of light from an exterior of the case; and
a second light receiving element disposed in the case to detect a light quantity of the direct current part of light entering from the light receiving window portion,
wherein the irregularity determining portion determines the state of one of the projection window portion and the entrance window portion based on the detected light quantity of the first light receiving element and the detected light quantity of the second light receiving element.

5. The object detecting apparatus according to claim 4, wherein the first light receiving element detects the light quantity entering from the projection window portion.

6. The object detecting apparatus according to claim 1, further comprising
a light quantity detecting unit disposed outside the case to detect a light quantity,
wherein the irregularity determining portion determines the state of at least one of the projection window portion and the entrance window portion based on the detected light quantity of the first light receiving element and the detected light quantity of the light quantity detecting unit.

7. The object detecting apparatus according to claim 1, wherein the irregularity determining portion is provided in a control portion inside the case.

8. The object detecting apparatus according to claim 1, wherein the case is disposed in a vehicle so as to detect the object near the vehicle or a distance between the vehicle and the object.

9. An object detecting apparatus according to claim 1, wherein the irregularity determining portion determines a dirt state of at least one of the projection window portion and the entrance window portion.

10. An object detecting apparatus for detecting an object or a distance from the object, the object detecting apparatus comprising:
a case;
an electromagnetic wave generation portion disposed in the case to generate and radiate a searching electromagnetic wave;
a projection window portion disposed in the case, the projection window portion having a wave passing surface made of a wave permeating material for passing through the searching electromagnetic wave generated from the electromagnetic wave generation portion;
an electromagnetic wave receiving portion disposed in the case for receiving a reflected wave of the searching electromagnetic wave, reflected from the object;
an entrance window portion disposed in the case, the entrance window portion having a wave passing surface made of a wave permeating material for passing through the reflected wave before being received to the electromagnetic wave receiving portion;
a light receiving element disposed in the case at a position where a direct current part of light entering from at least one of the projection window portion and the entrance window portion is restricted to be received, so as to detect a scattering light part of the direct current part, which generates when dirt adheres on at least one of the projection window portion and the entrance window portion; and
an irregularity determining portion which determines a state of at least one of the projection window portion and the entrance window portion using the detected light quantity of the light receiving element.

11. An irregularity detecting device for an object detecting apparatus including a sensor window portion through which an electromagnetic wave from an electromagnetic wave generating portion toward an object and a reflected electromagnetic wave from the object pass, the irregularity detecting device comprising:
a light receiving element disposed to detect a light quantity entering from the sensor window portion; and
an irregularity determining portion which determines a state of the sensor window portion using the detected light quantity of the light receiving element.

12. The irregularity detecting device according to claim 11, wherein:
the light receiving element includes a first light receiving portion and a second light receiving portion which receive the light quantities of direct current part of light entering from different positions of the sensor window portion; and
the irregularity determining portion determines the state of the sensor window portion based on the detected light quantities of the first and second light receiving portions.

13. The irregularity detecting device according to claim 12, wherein:
each of the first and second light receiving portions generates an output voltage in accordance with the received light quantity; and
the irregularity determining portion determines the state of the search window portion based on a ratio of the output voltages generated from the first and second light receiving portions.

14. The irregularity detecting device according to claim 11, further comprising:
a light receiving window portion through which light is entered, the light receiving window portion provided at a position different from the sensor window portion; and
an another light receiving element disposed to detect a light quantity entering from the light receiving window portion,
wherein the irregularity determining portion determines the state of the sensor window portion based on the detected light quantity of the light receiving element and the detected light quantity of the another light receiving element.

15. The irregularity detecting device according to claim 11, wherein the light receiving element is disposed in the case at a position where a direct current part of light entering from the sensor window portion is restricted to be received, so as to detect a scattering light part of the direct current part, which generates when an irregularity is present on the sensor window portion.

16. The irregularity detecting device according to claim 11, further comprising
a light quantity detecting unit disposed outside the case to detect a light quantity,
wherein the irregularity determining portion determines the state of at least one of the projection window portion and the entrance window portion based on the detected light quantity of the first light receiving element and the detected light quantity of the light quantity detecting unit.

17. The irregularity detecting device according to claim 11, wherein the irregularity determining portion determines a dirt state of at least one of the projection window portion and the entrance window portion.

* * * * *